United States Patent [19]

Tsukamoto et al.

[11] 4,017,904
[45] Apr. 12, 1977

[54] TAPE DRIVING DEVICE INCLUDING PINCH ROLLER AND TAPE GUIDE MOUNTING MEANS

[75] Inventors: Hiroyuki Tsukamoto, Kawasaki; Morio Akino, Fujisawa; Satoshi Hara, Naka, all of Japan; Kazuyoshi Kikuchi, deceased, late of Kawasaki, Japan; Yumiko Kon, representative; Jun Kon, representative, both of Sagamihara, Japan

[73] Assignee: Tokyo Shibaura Electric Co., Ltd., Kawasaki, Japan

[22] Filed: Sept. 11, 1975

[21] Appl. No.: 612,556

[30] Foreign Application Priority Data

Sept. 14, 1974 Japan .............................. 49-106495

[52] U.S. Cl. .................................. 360/90; 226/90; 226/187; 360/130
[51] Int. Cl.² .................. G11B 15/29; G11B 15/60; B65H 17/22; G03B 1/56
[58] Field of Search ................ 360/130, 90, 93, 95; 226/90, 187

[56] References Cited

UNITED STATES PATENTS

| | | | |
|---|---|---|---|
| 3,372,938 | 3/1968 | Hoag | 360/130 |
| 3,506,271 | 4/1970 | Greifenhagen et al. | 360/130 |
| 3,689,076 | 9/1972 | McAlvay | 360/130 |
| 3,913,144 | 10/1975 | Yagi et al. | 360/130 |

Primary Examiner—Robert S. Tupper
Attorney, Agent, or Firm—Oblon, Fisher, Spivak, McClelland & Maier

[57] ABSTRACT

A video tape recorder includes a capstan, a stationary magnetic head, a pair of rubber pinch rollers disposed on opposite sides of the capstan, and a pair of head-facing guides whereby to travel an endless tape at a high speed. Each pinch roller and head facing guide are mounted on a supporting member which may be rocked by a wire with a coil spring against the force of a tension spring so that the pinch roller and head facing guide can press the tape against the capstan and magnetic head. Such a state may be maintained by abutting the support member on a stop.

9 Claims, 7 Drawing Figures

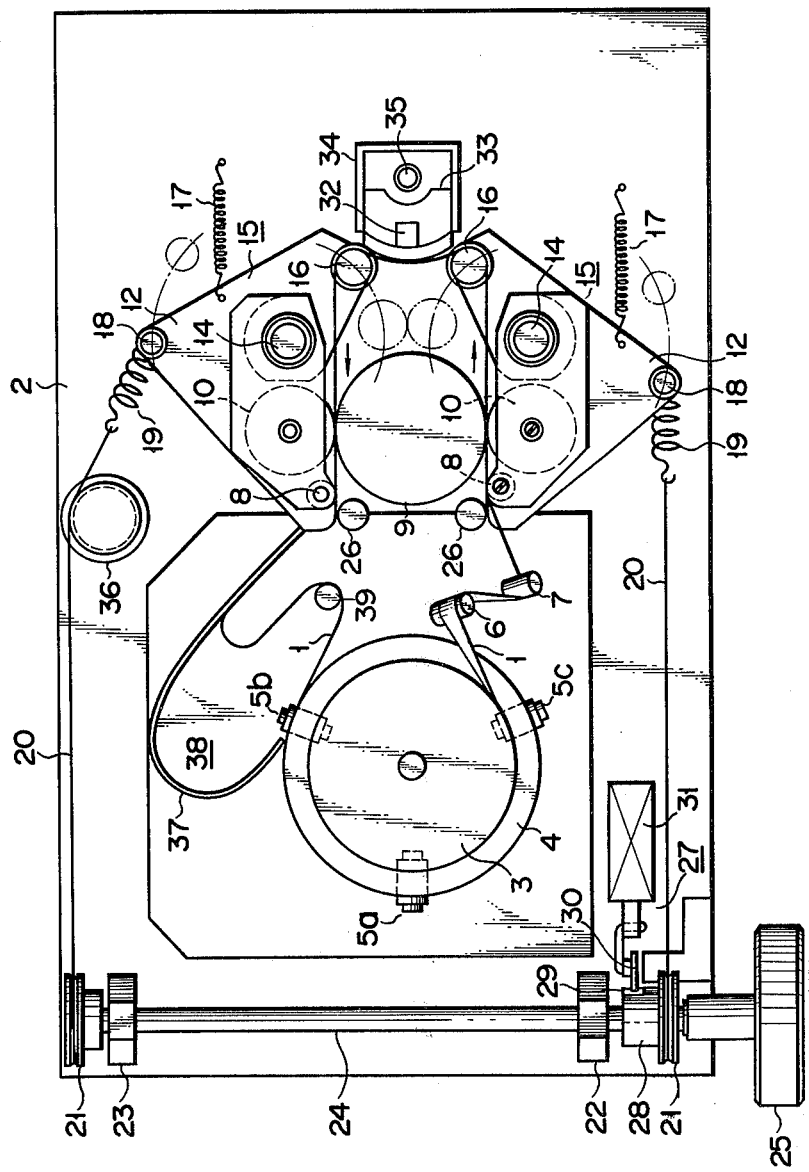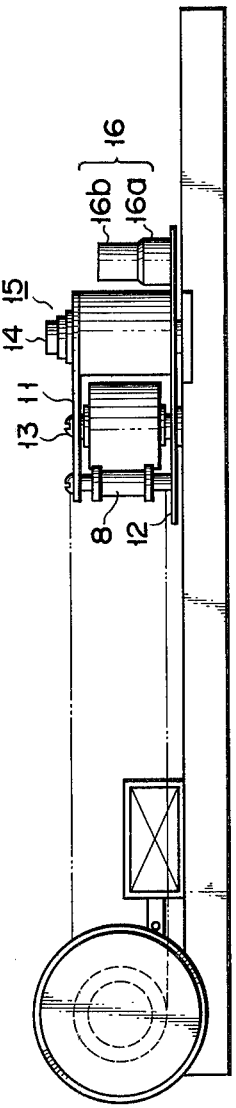
FIG. 1
FIG. 2

TAPE DRIVING DEVICE INCLUDING PINCH ROLLER AND TAPE GUIDE MOUNTING MEANS

BACKGROUND OF THE INVENTION

This invention relates to a tape driving device suited to, for example, a video signal recording and reproducing apparatus of stationary head type, and more particularly to a device having an improved loading mechanism for loading an endless tape.

Generally, a tape driving device for use in the video signal recording and reproducing device, i.e., a video tape recorder (which is hereinafter referred to as "VTR") is constructed such that a pinch roller formed of, for example, rubber is pressed, through an endless tape, against the peripheral surface of a capstan being rotated by a motor and the tape is allowed to travel through rotation of the capstan. In this tape driving device, in order to stably record and reproduce a video signal, the tape usually is pressed on a magnetic head by a tape guide facing the head.

The above-mentioned pinch roller and tape guide desirably are movably so provided that when the tape is loaded, interspaces each permitting an easy insertion of the tape thereinto are formed between the pinch roller and the capstan and between the tape guide and the head. Therefore, a pinch roller driving mechanism for permitting the pinch roller to abut against and to be a part from the capstan, and a tape guide driving mechanism for permitting the tape guide to abut against and to be apart from the head usually are separately provided, and independently or interlockingly operated. However, such a tape loading means wherein said two mechanisms are separately provided not only has the drawback that it is made complicated in construction with the result that the manufacturing cost is increased, but also should be manufactured with an extremely high precision. The reason for the latter disadvantage is that in the case where a variation occurs in the distance between each one of said mechanisms and the surface of a substrate, that is the horizontal or vertical degree of each said mechanism relative to the substrate surface, or the movable range of each said mechanism, the pinch roller and tape guide fail to uniformly contact with the travelling tape to make the tape travel unstable. Particularly for the stationary head type VTR requiring a long endless tape to travel at a high speed of, for example, 10 m per second the presence of even a small eccentricity or displacement in each said mechanism causes a great decrease in the stability of the tape travel. Therefore, said tape loading means have to be manufactured with a sufficiently high precision. Further, the unevenness of tape travel, that is, wows and flutters appear in a picture of the VTR in the form of jitters. One of the reasons why the stationary head type VTR has not yet been put to practical use is that the high-speed travel of the endless tape is followed by the occurrence of too many wows and flutters.

SUMMARY OF THE INVENTION

The object of the invention is to provide a tape driving device which, even in case where a mechanism for driving the pinch roller and tape guide is not manufactured with a particularly high precision, makes it possible to position the pinch roller and tape guide with a good precision to permit the tape to travel in a stable condition, makes the loading of endless tape simple and easy, and can be made simple in construction and manufactured inexpensively.

BRIEF DESCRIPTION OF THE DRAWING

FIG. 1 is a plan view of a stationary head type VTR to which an embodiment of the invention is applied;

FIG. 2 is a side view of part of the stationary head type VTR of FIG. 1;

DESCRIPTION OF THE PREFERRED EMBODIMENTS

Figure 3A:
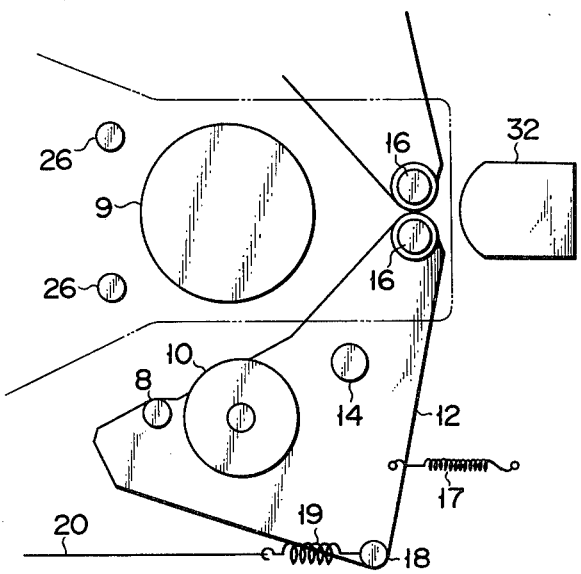
FIGS. 3a and 3b are plan views respectively showing the different operative conditions of a support mechanism of the embodiment of the invention.

Hereinafter, the embodiment of the invention will be described with reference to the drawings.

In FIGS. 1 and 2, an endless magnetic tape 1 is wound about a reel 3 rotatably mounted on a substrate 2 in such a manner that the tape 1 is drawn out from the innermost periphery of a tape roll 4 and taken up from the outermost periphery thereof. The underside of the tape roll 4 wound about the reel 3 is supported by three rubber rollers 5a, 5b and 5c rotatably mounted on the substrate 2 and, when tape travel is carried out, the tape roll 4 is rotated about its axis while the rubber rollers 5a, 5b and 5c are also rotated by the tape. The tape 1 is drawn out from the innermost periphery of the tape roll 4 in a manner twisted at prescribed angles and guided by first and second poles 6, 7 erected obliquely to the substrate 2. The tape is then returned to a condition wherein the lower end edge of the tape is in parallel with the upper surface of the substrate 2. Thereafter, while the width-directional movement of the tape 1 is being regulated by a guide roller 8 provided on a support mechanism 15 as later described, the tape 1 is introduced between a capstan 9 and a first pinch roller 10. The capstan 9 is subjected to a high-speed rotation by a motor (not shown) provided on the underside of the substrate 2. At least the outer peripheral portion of the first pinch roller 10 is formed of an elastic material such as rubber and the axial center portion of the first pinch roller 10 is rotatably supported, by a shaft 13, between the side-ends of a pair of parallel support plates 11, 12. The support plates 11, 12 are rockably supported, substantially at their central portions, on a rocking shaft 14 vertically erected on the substrate 2. Accordingly, by rocking about said rocking shaft 14 the support mechanism 15 comprising support plates 11, 12 and said shaft 13, the pinch roller 10 can come near to or go away from the peripheral surface of the capstan 9. The lower support plate 12 of said support mechanism 15 has a substantially triangular form, that is, three angular portions. A first head facing guide 16 is provided at the first angular portion of said triangular plate 12, that is, at a position which is substantially opposite to that at which said first pinch roller 10 is provided, with respect to the rocking shaft 14. This first head facing guide 16 is constructed such that on a columnar base shaft 16a attached on the support plate 12 a guide shaft 16b whose outer diameter is a little smaller than that of the base shaft 16a is coaxially mounted so as to guide the tape 1 along the peripheral surface of the guide shaft 16b while supporting the lower side edge of the tape 1 by the upper face of the base shaft 16a. To a portion near the second angular portion of the triangular support plate 2 is connected one end of a tension coil spring 17, the other end of which is fixed to the substrate 2. Thus, the coil spring 17 imparts to the support mechanism 15 a force permitting the support mechanism 15 to be rocked counterclockwise of FIG. 1. That is, the coil spring 17 may act as a first rocking force-imparting means referred to here in the present invention. In a normal state (nonoperative state), therefore, the support mechanism 15 is rocked counterclockwise of FIG. 1, in which state the first pinch roller 10 located near the third angular portion of the support mechanism 15 is separated from the capstan 9 and the first head facing guide 16 is far from a magnetic head 32 as later described (position indicated by a broken line of FIG. 1).

In the last-mentioned state, the tape 1 is inserted between the capstan 9 and the pinch roller 10 and between the tape guide 16 and the magnetic head 32 as later described, as shown in FIG. 3a. After the support mechanism 15 is rocked clockwise of FIG. 1 by a next-mentioned means, that is, by a second rocking force-imparting means, the tape may be travelled.

In FIG. 1, a pin 18 is provided at the second angular portion of the triangular support plate 12 of the support mechanism 15, that is, at an angular portion different from those at which the pinch roller 10 and the tape guide 16 are provided respectively. To this pin 18 one end of a wire 20 is connected through a coil spring 19. The other end of the wire 20 is connected to the wire take-up section of a take-up wheel 21.

The take-up wheel 21 is fixed to a rotary shaft 24 rotatably supported by a pair of bearings 22, 23 provided on the substrate 2. To an end of the rotary shaft 24 is attached a knob 25 for rotating as required the rotary shaft 24 and thus the take-up wheel 21 so as to permit the wire 20 to be taken up. When the wire 20 is taken up onto the take-up wheel 21, a clockwise rocking force is imparted to the support mechanism 15 through the coil spring 19. Since the coil spring 19 is so designed as to have a spring constant greater than that of the coil spring 17, the support mechanism 15 is rocked clockwise while extending the coil spring 17, when the wire 20 is pulled. Through this rocking movement, the first pinch roller 10 is contacted to the capstan 9 through the tape and the tape guide 16 is approached to the magnetic head 32 as later described. When, thereafter, the wire 20 is taken up further, the support mechanism 15 is further rocked clockwise but, after a little further rocking movement, it is stopped by a stop 26 erected on the substrate 2. This stop 26 is provided at a position permitting the capstan 9 to press the first pinch roller 10 with a prescribed pressure when the support mechanism 15 has been rocked up to a position at which it abuts against the stop 26. After the clockwise rocking movement of the support mechanism 15 is stopped by the stop 26, the wire 20 is taken up further, the coil spring 19 is extended. A tension corresponding to this extension of the coil spring 19 acts on a pressing force of the stop 26 with the support mechanism 15. Accordingly, the support mechanism 15 is stably kept in a state allowed to abut against the stop 26, so that a force causing the pinch roller 10 to be pressed against the capstan 9 is stably maintained. After the take-up knob 25 is rotated about its axis by a specified amount, the rotary shaft 24 is prevented by a reverse rotation-preventing device 27 from being reverse-rotated even if the knob 25 is released. The back rotation-preventing device 27 is so constructed that the back rotation of the rotary shaft 24 is prevented by inserting with a spring froce the tip end of an engagement pawl 30 into a groove 29 formed in an engagement ring 28 fixed to the rotary shaft 24. In this case, however, said groove 29 is formed in a saw-tooth like configuration so that when the take-up knob 25 is rotated in a wire-taking up direction, that is, in a positive direction, the engagement pawl 30 is automatically disengaged from the groove 29 of the engagement ring 28. Note that a base end of the engagement pawl 30 is connected to a disengaging electro-magnetic mechanism 31 provided on the substrate 2 whereby disengagement of the pawl 30 from the groove 29 is effected as required.

Figure 3B:
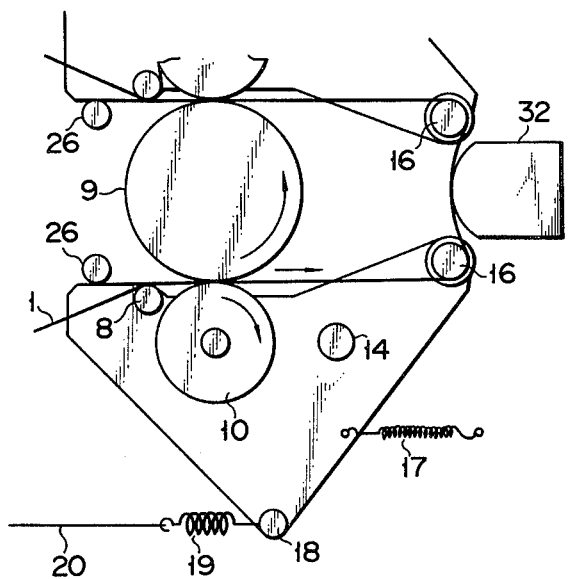

Thus, the tape pressed to the capstan 9 by the first pinch roller 10, as shown in FIG. 3b, is allowed to travel by the pinch roller 10 rotated according to the rotation of the capstan 9 in a direction indicated by arrows shown, and is so guided as to cause the recording face of the tape 1 to be pressed against the magnetic head 32 by the first head-faced guide 16. The magnetic head 32 is fixed in the longitudinal direction of the tape 1 and is movable in the width direction of the tape 1 at prescribed pitches. In other words, a fixing member 33 for fixing the head 32 is made only vertically slidable by a guide frame 34, and is vertically driven through rotation of a screw mechanism 35. Note that this screw mechanism 35 is stepwise rotated through prescribed unit rotation angles by a pulse motor not shown. A second support mechanism 15 completely similar to said first support mechanism 15 is provided in a manner sandwiching the capstan 9 together with said support mechanism. Said second support mechanism 15 has the same construction and action as those of the first support mechanism 15. Therefore, the corresponding parts and sections to those of the support mechanism 15 are denoted by the same reference numerals and description thereof is omitted.

The tape 1 having passed along the head 32 while its recording face is being allowed to contact the head 32 is guided by a second head facing guide 16 of said second support mechanism 15 and is introduced between the capstan 9 and a second pinch roller 10 of said second support mechanism 15.

In order to smoothly guide the second wire 20 operating the second support mechanism 15 to the second take-up wheel 21 fixed on the shaft 24, that is, in order to stretch the second wire 20 in a manner spaced from a tape slacking means 38 as later described, a guide roller 36 is additionally provided which is mounted on the substrate 2 so as to guide the second wire 20 along the side edge of the substrate 2. Correspondingly to the additional provision of said guide roller 36, the configuration of the second support plate 12 of said second support mechanism 15 is made a little different from that of said first support plate 12 and the second pin 18 to which the second wire 20 is connected is more or less displaced from a corresponding position to that at which the previously mentioned pin 18 is erected.

The tape 1 having passed between the second pinch roller 10 and the capstan 9 enters into the tape slacking means 38 surrounded by a curved guide plate 37 and is guided by a third pole 39 erected on the substrate 2 so as to be taken up into said reel 3. When, therefore, the electro-magnetic mechanism 31 is operated, the engagement pawl 30 is drawn out from the groove 29 of the engagement ring 28. Accordingly, the rotary shaft 24 is reversely-rotated due to the restoring forces of the coil springs 19, 17 so as to rewind the wire 20. Due to the restoring forces of the coil springs 17 the first support mechanism 15 is rocked counterclockwise while the second support mechanism 15 is rocked clockwise. Thus, the first and second pinch rollers 10 are separated from the peripheral surface of the capstan 9 and the first and second head facing guides 16 move away from the magnetic head 32. Thus, the tape travel ceases and the tape travel path is released.

In the above-mentioned tape driving device of the invention, the pinch roller 10 and the head facing guide 16 are fitted to the single support mechanism 15. Simply by fitting the support mechanism 15 commonly supporting the pinch roller 10 and head facing guide 16 to one rocking shaft 14, therefore, the level and position of the pinch roller 10 relative to those of the capstan 9, and the level and position of the head facing guide 16 relative to those of the magnetic head 32 can be selectively determined with high accuracy. This means that a variation of the positional relationship between the pinch roller and the head facing guide, particularly of the level relationship therebetween is very small. Accordingly, the tape 1 can be stably subjected to high-speed travel with the aid of the action of the stop as later described and therefore is quite useful to a stationary head type VTR requiring an endless tape to travel at a speed of more than 5 m per second, for example, 10 m per second. Further, it is not necessary to separately manufacture and adjust the pinch roller 10 and the head facing guide 16, that is, it is possible to manufacture and adjust both at the same time, which offers an advantage that the manufacturing cost is reduced. Further, by rocking the support mechanism 15, contact and separation of the pinch roller 10 with and from the capstan 9, and contact and separation of the head facing guide 16 with and from the head 32 can be effected at the same time, and therefore tape loading is readily carried out. Further, the support mechanism 15 is allowed to abut against the stop 26 with a prescribed pressure due to the tension of the coil spring 19 and therefore is stably maintained in place even while the tape 1 is subjected to high-speed travel, which eliminates the possibility of the pinch roller 10 and the head facing guide 16 being unnecessarily vibrated.

Figure 4:
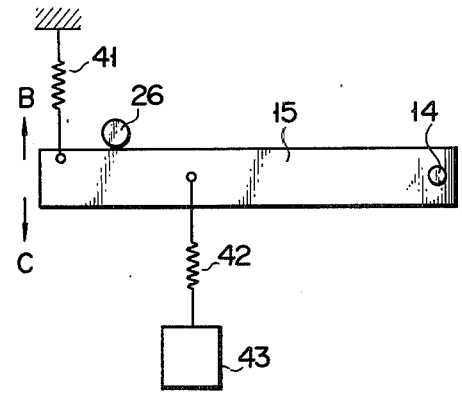
FIG. 4 is a schematic view for explaining the action of a stop in the embodiment of the invention.
Figure 5A:
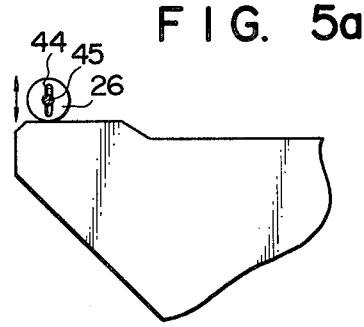
FIGS. 5a and 5b are plan views showing means for attaching the stop of the embodiment of the invention.
Figure 5B:
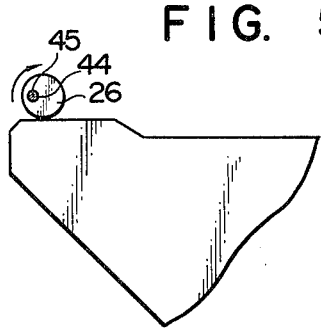

Hereinafter, the reason why the above-mentioned unnecessary vibrated is prevented will be explained referring to FIG. 4. The pinch roller 10, thus the pinch roller support mechanism 15 is dynamically supported in such a relation as shown in FIG. 4. In FIG. 4, the reference numeral 41 designates a tension means comprising the wire 20 having the coil spring 19, said tension means urging the support mechanism 15 in a B-indicated direction. The reference numeral 42 denotes a tension means whose tensile force is equivalent to an elastic force acting on the pinch roller 10 when the elastic material constituting the outer peripheral portion of the pinch roller has been brought into abutment with the capstan 9, said tension means urging the support mechanism 15 in a C-indicated direction. At the time of tape travelling, unless the stop 26 is provided, the support mechanism 15 will be forcedly vibrated due to the elastic forces which act in mutually opposite directions with respect to the rocking shaft 14. However, where the stop 26 is provided as shown in FIG. 4 so as to thereby limit the B-directional rocking movement of the support mechanism 15 to a prescribed value or less, the forced vibration of the support mechanism 15, and thus of the pinch roller 10 is broadly restricted with the result that the tape vibration can also be prevented. Conveniently, the position of the stop 26, as shown in FIGS. 5a and 5b, is made movable and thus adjustable so as to control the displacing amount of support mechanism 15. In FIG. 5a, the position of the stop 26 is made minutely adjustable in the arrow-indicated direction by inserting a fixed bolt 45 through a slot 44 formed in the stop 26 and movably fixing the stop 26 to the substrate 2 by the bolt 45. In FIG. 5b, the position of the stop 26 is made minutely adjustable by inserting the fixed bolt 45 through a hole 44 eccentrically bored in the stop 26 and fixing the stop 26 to the substrate and by pivotably moving the stop 26 about the fixed bolt 45 in the arrow-indicated direction.

This invention is not limited to the above-mentioned embodiment but can be practiced in various modifications without departing from the object and scope of the invention. For example, the support mechanism 15 is not limited to a triangular one but may be rectangular, etc. Further, the rocking means for rocking the support mechanism is not limited to the assembly of the coil spring and wire but may be an electrically driving means, or a rocking means based on the utilization of air pressure, oil pressure or the like. The above-mentioned embodiment referred to the case where this invention is applied to the stationary head type VTR, but this invention is widely applicable to other devices.

As above described, the device of this invention is so constructed that the pinch roller causing an endless tape to travel and the head facing guide causing said tape to be pressed against the head are integrally attached to first and second end portions of each of a pair of support mechanisms rockably provided near to the opposite sides of the capstan and head; and said paired support mechanisms are respectively rocked counterclockwise and clockwise by the first and second rocking force-imparting means for rocking the support mechanisms in a prescribed range, so as to permit the pinch rollers and the head facing guides to come near to or move away from the capstan and the head, whereby when the support mechanisms are pressed with a prescribed pressure against the stop by said second rocking force-imparting means, the pinch rollers are pressed against the capstan and simultaneously the head facing guides cause the tape to be pressed against the head.

According to the invention, therefore, a stop is so designed as to act on the support mechanism for shifting the pinch roller and tape guide, which results in a simple structure and easy adjustment of the tape driving device, and accordingly, in an inexpensive manufacture of the tape driving device. Further, the level relationship, or other positional relationships between the pinch roller and the tape facing guide are fixed and therefore even when the device is not manufactured with a particularly high precision, there is no problem that the levels of the pinch roller and tape facing guide as viewed from the substrate surface become uneven or irregular. That is to say, the pinch roller and tape guide can be arranged with good precision. Further, the support mechanism is prevented from being freely vibrated because of the coaction of the stop and rocking force-imparting means, and therefore the vibration of the pinch roller, tape facing guide, etc. may be minimized. Accordingly, the unevenness of tape travel is reduced and therefore the present device is very useful in putting to practical use the stationary head type VTR requiring the tape to travel at a high speed. Further, the pinch roller and the tape facing guide are operated simultaneously simply by rocking the support mechanism and therefore the endless tape loading can be readily performed. According to the present invention, therefore, a tape driving device having various advantages can be provided.

What we claim is:

1. A tape driving device comprising:
   a base,
   a capstan rotatably mounted on said base,
   a stationary magnetic head provided near the capstan,
   a pair of supporting members pivotably disposed on opposite sides of the capstan,
   a pinch roller having an elastic peripheral surface and rotatably supported near the capstan on each one of the supporting members,
   a head facing tape guide supported near the magnetic head on each one of the supporting members,
   means mounting each of said supporting member on said base for pivotal movement between a first position in which the pinch roller thereof and tape guide thereof press a magnetic tape against the capstan and the magnetic head, respectively, so as to facilitate the drive of said tape by said pinch rollers and said capstan and the recording and reproduction of material upon said tape by said magnetic head, and a second position in which the pinch roller and the tape guide are spaced apart from the capstan and the magnetic head, respectively so as to facilitate the loading or removal of said tape with respect to said pinch rollers, said capstan, and said magnetic head,
   a first pivotable force-imparting means normally pivoting each of the supporting members to the second position,
   a second pivotable force-imparting means selectively pivoting each of the supporting members to the first position against the force of the first pivotable force-imparting means, and
   a limiting member limiting the pivotable movement of each of the supporting members in the first position against the force of the second pivotable force-imparting member.

2. A tape driving device according to claim 1 which further includes a reel rotatably mounted on the substrate and supporting a roll of the magnetic tape around the periphery thereof and guide means guiding the tape from the innermost periphery of the tape roll and guiding the tape between the capstan and pinch roller and between the magnetic head and head facing guide.

3. A tape driving device according to claim 2 wherein said tape guiding means includes:
   a first pole obliquely mounted on said base so as to guide the tape from the tape roll in a predetermined angular manner,
   a second pole obliquely mounted on said base so as to guide the tape from the first pole so that the lower end edge of the tape is parallel with the surface of said base, and
   a guide roller mounted on each of the supporting members so as to guide the tape from the second pole and between the capstan and said respective pinch roller.

4. A tape driving device according to claim 1 wherein each of the supporting members includes a first end portion upon which one of the pinch rollers is mounted and a second end portion upon which one of the head facing tape guides is mounted, and is pivoted around an axis disposed between the first and second end portions.

5. A tape driving device according to claim 4 wherein each one of the head facing tape guides includes a base shaft attached to each of the supporting members at one end thereof and a guide shaft coaxially attached to the other end of the base shaft and having a smaller diameter than the base shaft.

6. A tape driving device according to claim 4 wherein each of the first pivotable force-imparting means includes a tension coil spring one end of which is connected to one of the supporting members and the other end of which is connected to said base.

7. A tape driving device according to claim 6 wherein each one of the second pivotable force-imparting means includes a wire having a coil spring at its midway, one end of which is connected to each one of the supporting members, and a wire pulling means to which the other end of the wire is connected.

8. A tape driving device according to claim 7 wherein each one of the wire pulling means includes a rotary shaft, bearings mounted on said base and rotatably supporting the rotary shaft, a knob attached to an end of the rotary shaft, a pair of wheels fixed to the rotary shaft, the other end of the wire being wound around each of the wheels, and a member for preventing the rotary shaft from being rotated by each one of the first pivotable force-imparting members.

9. A tape driving device according to claim 1 wherein each of the limiting members includes a stop and means adjustably mounting said stop on said base so that its position is adjustable with respect thereto, and abutting each of the supporting members so as to limit the pivotable movement thereof.

* * * * *